(12) United States Patent
Cui et al.

(10) Patent No.: US 6,956,581 B2
(45) Date of Patent: Oct. 18, 2005

(54) GAMUT MAPPING ALGORITHM FOR BUSINESS GRAPHICS

(75) Inventors: Chengwu Cui, Lexington, KY (US); Raymond E. Clark, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 343 days.

(21) Appl. No.: 10/247,590

(22) Filed: Sep. 19, 2002

(65) Prior Publication Data

US 2004/0056867 A1 Mar. 25, 2004

(51) Int. Cl.$^7$ .............................. G06K 9/00; H04N 1/60
(52) U.S. Cl. ...................... 345/589; 345/590; 345/597; 348/557; 358/518; 358/520; 382/162; 382/166; 382/167
(58) Field of Search .................................. 345/589–591, 345/593, 597, 600, 604; 358/518–520, 525, 1.1; 382/162–167; 348/496, 502, 557–584, 617, 624, 650

(56) References Cited

U.S. PATENT DOCUMENTS

| | | |
|---|---|---|
| 4,605,954 A | 8/1986 | Bestenreiner et al. |
| 4,647,963 A | 3/1987 | Johnson et al. |
| 4,661,843 A | 4/1987 | Sekizawa et al. |
| 4,751,535 A | 6/1988 | Myers |
| 4,812,902 A | 3/1989 | Fuchsberger |
| 4,812,903 A | 3/1989 | Wagensonner et al. |
| 4,831,434 A | 5/1989 | Fuchsberger |
| 4,929,978 A | 5/1990 | Kanamori et al. |
| 4,961,088 A | 10/1990 | Gilliland et al. |
| 4,963,978 A | 10/1990 | Ueda et al. |
| 5,021,828 A | 6/1991 | Yamaguchi et al. |
| 5,243,414 A | 9/1993 | Dalrymple et al. |
| 5,268,754 A | 12/1993 | Van de Capelle et al. |
| 5,272,503 A | 12/1993 | LeSueur et al. |

(Continued)

FOREIGN PATENT DOCUMENTS

| | | |
|---|---|---|
| JP | 56-069668 | 6/1981 |
| JP | 61-288690 | 12/1986 |
| JP | 62-230159 | 10/1987 |

OTHER PUBLICATIONS

Gustav J. Bruan and Mark D. Fairchild; General–Purpose Gamut–Mapping Algorithms: Evaluation of Contrast-Preserving Rescaling Functions for Color Gamut Mappig; 32 pgs.

Jan Morovic and M. Ronnier Luo; Color Research and Application; The Fundamentals of Gamut Mapping; Jul. 29, 1999; 24 pgs.

Jan Morovic and M. Ronnier Lui; Colour & Imaging Institute; The Pleasantness and Accuracy of Gamut Mapping Algorithms; 4 pgs.

Jan Morovic and M. Ronnier Lui; Colour & Imaging Institute; A Universal Algorithm for Colour Gamut Mapping; 9 pgs.

Jan Morovic; Colour & Imaging Institute; Gamut mapping and ICC rendering intents; 11 pgs.

(Continued)

*Primary Examiner*—Matthew C. Bella
*Assistant Examiner*—Wesner Sajous
(74) *Attorney, Agent, or Firm*—Coats & Bennett, PLLC (57) ABSTRACT

A gamut mapping algorithm especially adapted for printing business and presentation graphics with highly chromatic colors. To perform gamut mapping, gamut triangles corresponding to an input gamut and output gamut are defined and used to scale the lightness and chroma of input colors. The rescaled input colors are then mapped to the output triangle along lines of constant chroma. The chroma of the remapped colors is enhanced by moving the remapped colors toward the apex of the output gamut triangle along a line passing through the remapped color and the apex of the output gamut triangle.

48 Claims, 4 Drawing Sheets

U.S. PATENT DOCUMENTS

| | | |
|---|---|---|
| 5,283,597 A | 2/1994 | Yoshida et al. |
| 5,299,291 A | 3/1994 | Ruetz |
| 5,317,426 A | 5/1994 | Hoshino |
| 5,323,249 A | 6/1994 | Liang |
| 5,359,436 A | 10/1994 | Dichter et al. |
| 5,384,601 A | 1/1995 | Yamashita et al. |
| 5,450,216 A | 9/1995 | Kasson |
| 5,450,217 A | 9/1995 | Eschbach et al. |
| 5,510,910 A * | 4/1996 | Bockman et al. ............ 358/502 |
| 5,517,335 A | 5/1996 | Shu |
| 5,537,228 A | 7/1996 | Dillinger |
| 5,539,540 A | 7/1996 | Spaulding et al. |
| 5,574,666 A | 11/1996 | Ruetz et al. |
| 5,583,666 A | 12/1996 | Ellson et al. |
| 5,596,428 A | 1/1997 | Tytgat et al. |
| 5,612,795 A | 3/1997 | Dichter |
| 5,615,312 A | 3/1997 | Kohler |
| 5,650,942 A | 7/1997 | Granger |
| 5,708,912 A | 1/1998 | Lee |
| 5,712,925 A | 1/1998 | Ohga |
| RE35,751 E | 3/1998 | Midgley |
| 5,724,443 A | 3/1998 | Nishikawa |
| 5,731,818 A | 3/1998 | Wan et al. |
| 5,748,342 A | 5/1998 | Usami |
| 5,767,992 A | 6/1998 | Tanaka et al. |
| 5,790,282 A | 8/1998 | Hayashi et al. |
| 5,835,817 A | 11/1998 | Bullock et al. |
| 5,867,284 A | 2/1999 | Heinrichs et al. |
| 5,867,286 A | 2/1999 | Lee et al. |
| 5,923,917 A | 7/1999 | Sakurai et al. |
| 5,933,256 A | 8/1999 | Ebner |
| 5,937,089 A | 8/1999 | Kobayashi |
| 5,966,222 A | 10/1999 | Hirata et al. |
| 5,978,011 A | 11/1999 | Jacob et al. |
| 5,987,165 A * | 11/1999 | Matsuzaki et al. .......... 382/162 |
| 5,991,511 A * | 11/1999 | Granger ..................... 358/1.9 |
| 6,025,885 A | 2/2000 | Deter |
| 6,028,646 A | 2/2000 | Jeong et al. |
| 6,040,926 A | 3/2000 | Vondran, Jr. |
| 6,084,689 A | 7/2000 | Mo |
| 6,101,272 A | 8/2000 | Noguchi |
| 6,125,199 A | 9/2000 | Sato et al. |
| 6,128,022 A * | 10/2000 | Dillinger .................... 345/591 |
| 6,154,217 A | 11/2000 | Aldrich |
| 6,172,681 B1 | 1/2001 | Ueda |
| 6,185,013 B1 | 2/2001 | Harrington et al. |
| 6,198,843 B1 | 3/2001 | Nakauchi et al. |
| 6,421,142 B1 * | 7/2002 | Lin et al. ..................... 358/1.9 |
| 6,775,028 B1 * | 8/2004 | Reel ............................ 358/1.9 |
| 2002/0041393 A1 * | 4/2002 | Takahashi et al. ......... 358/1.15 |

OTHER PUBLICATIONS

Jan Morovic; To Develop a Universal Gamut Mapping Algorithm; Oct. 1998; 203 pgs.

P. Laihanen; University of Technology; Color Reproduction Theory Based on the Principles of Colour Science; 9 pgs.

* cited by examiner

//GAMUT MAPPING ALGORITHM FOR BUSINESS GRAPHICS

FIELD OF THE INVENTION

The present invention relates generally to gamut-mapping algorithms for mapping input colors produced by an input device to output colors reproducible by an output device. More particularly, the present invention relates to a gamut mapping algorithm suitable for business graphics and other applications where highly chromatic colors are desired.

BACKGROUND OF THE INVENTION

Most devices are capable of sensing or reproducing only a portion of the full range of colors that can be realized with monochromatic lights and discerned by a human observer. In the art, the term "gamut" refers to the range of colors that a device, such as a CRT or color printer, can produce.

The gamut for a particular device is determined by a variety of factors and will differ from one device to another. For example, CRT monitors use additive color reproduction to produce colors within their gamut. Each pixel within a monitor comprises three phosphors—red, green, and blue. These phosphors can emit light of varying intensities, depending on the excitation of the phosphor. The size of the phosphors is such that it is below the resolving power of the human visual system. Thus, the light emitted by individual phosphors merges with the light coming from its neighbors. Due to the phosphors having high chroma, the gamut of a typical CRT monitor is quite large compared to many other devices.

In contrast to CRT monitors, color printers use subtractive color reproduction wherein colorants (e.g., inks, toners, etc.) with various spectral characteristics absorb different parts of the light illuminating the print. In general, the intensity of the colors used in a color printer cannot be varied directly. Instead, a color printer creates perceived changes of intensity by printing dots of different sizes, which are below the resolving power of the human eye. As the human eye cannot resolve individual dots, the stimuli they produce blend together to produce the different colors of the printer gamut.

It is often desired to reproduce an image generated on one medium on a different medium. For example, it is often desired to reproduce an image generated by a CRT or scanner on a print medium. It is likely that many colors in the CRT gamut are outside the gamut of the printer. Colors outside the reproduction range of an output device are referred to as "out of gamut" colors. These "out of gamut" colors cannot be reproduced exactly. Instead, some "in gamut" color that is within the reproduction range of the printer must be substituted for each "out of gamut" color in order to reproduce the image. This substitution of colors is performed by gamut mapping algorithms.

Numerous techniques exist for mapping colors from an input gamut to an output gamut depending on the objectives sought. Some of the more common approaches include maintaining hue and lightness for the out-of-gamut colors and clipping chroma to the gamut boundary, or compressing the input gamut so that the colors fall within the output gamut. The chroma clipping and compression techniques work well for certain images, such as photographs, that contain few out-of-gamut colors. However, highly chromatic colors are very appealing for some images, such as presentation graphics. For these types of images, the chroma clipping and compression techniques may not produce acceptable results because the output images will be noticeably lower in chroma.

The purpose of using colors in images such as business graphics is to make information maximally appealing and discernable to the human eye. When a business graphics image was created, it was usually designed with the assist of a display device such as a CRT screen, which has a relatively large gamut. The designer of the image may not be able to foresee what type of medium that the created image will be reproduced on and what viewing conditions will be used. As a result, the design intention may not be fulfilled due to significant gamut differences between the CRT used and the medium that the image is to be reproduced on. Non-ideal viewing conditions can also significantly reduce the actual gamut of the reproduction.

Although it is always desirable to maintain reasonable color accuracy, including chroma accuracy, there are reasons that can justify the use of chroma enhanced colors for illustration purposes as stated above. One is that the human visual system is known to be highly adaptive to stimuli strength including color chroma and lightness. Color accuracy in chroma and lightness is therefore difficult to define for a business graphic image. In contrast, if a gamut mapping algorithm maps the colors to corresponding colors of maximum chroma while maintaining the contrast, it ultimately fulfills the initial intention of the designer of the image, which is to make information maximally appealing and discernable to the human eye. Also, when a reproduction device has some portion of gamut that is larger than the initial CRT gamut used for designing the image, such algorithms allow these colors to be used in the image. Further, in situations that the reproduction system has an unusually small gamut, such as some special label printers, such gamut mapping algorithm can make a vast visual difference in prints.

Consequently, there is a need for a gamut mapping algorithm especially adapted for use in business and presentation graphics or similar images with highly chromatic colors.

SUMMARY OF THE INVENTION

The present invention relates to a gamut-mapping algorithm for mapping input colors (e.g. colors within the input gamut) to output colors that can be reproduced by the output device (e.g., colors within the output gamut) so as to enhance the chroma or vividness of the reproduced image. The gamut mapping algorithm is particularly useful for business graphics where highly chromatic colors are preferred and color accuracy is not a primary concern. It is known that the human eye may not be able to discriminate chroma and lightness for small color differences. This invention makes use of this fact to enhance colors along the axis of maximum chroma which is defined by the color of the maximum chroma and a certain reference point on the neutral axis. Enhanced along axes defined as such optimally preserves contrast and avoids mapping artifacts such as color contours that often resulted from traditional chroma clipping or compression algorithms.

In one exemplary embodiment of the invention, colors within the input gamut are mapped to corresponding colors within the output gamut for each hue angle. Following the mapping of colors from the input gamut to the output gamut, the chroma of the remapped colors is enhanced by moving the remapped colors toward the apex of an output gamut triangle. More particularly, the remapped colors are moved toward the apex of the output gamut triangle along a line extending through the remapped colors and the apex of the output gamut triangle. This chroma enhancement may be used in conjunction with additional color adjustment techniques, which can be performed either before or after the chroma enhancement step.

Various techniques can be used to determine the bounds of the gamut triangles. One technique takes the point of maximum chroma as the apex of the output gamut triangle. A line between the apex and the point of maximum lightness on the neutral axis may define the upper bound, and a line between the apex and the point of least lightness on the neutral axis may define the lower bound of the maximum triangle. An alternative technique defines the upper and lower bounds of the triangle first and uses the intersection of the upper and lower bounds as the apex of the output gamut triangle.

DETAILED DESCRIPTION OF THE INVENTION

Figure 1:
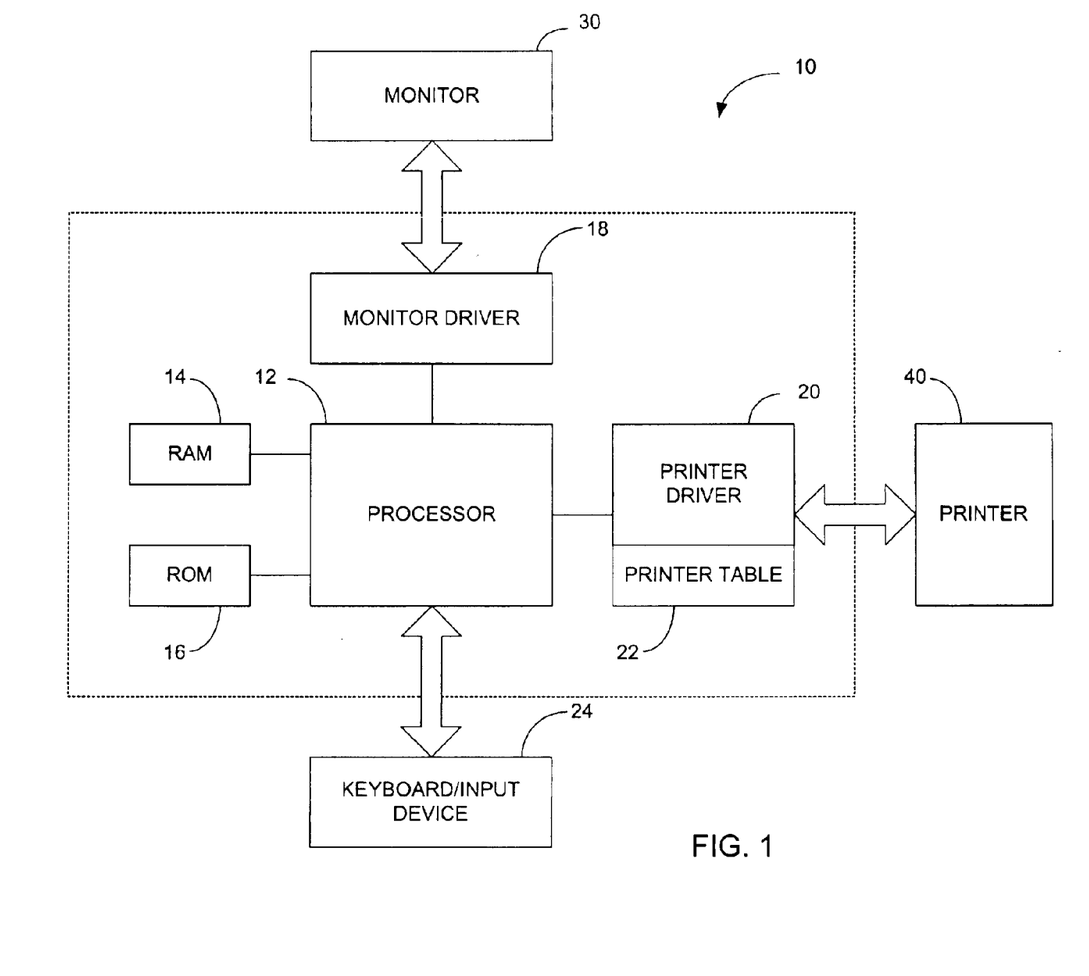
FIG. 1 is a block diagram of a general purpose programmable computer for practicing the present invention.

FIG. 1 is a block diagram of a computer system indicated generally by the numeral 10. The computer system 10 comprises a general purpose programmable computer 10, a monitor 30, and a color printer 40. Computer 10 comprises a processor 12, such as a 50586 processor, a random access memory (RAM) 14 that provides a temporary storage area for the processor 12, a read-only memory (ROM) 16 that provides static storage for processor 12, a monitor driver 18 for the monitor 30, and a printer driver 20 for the printer 40. Monitor 30 may comprise a conventional cathode ray tube (CRT) monitor 30, a liquid crystal display (LCD) monitor 30, or other type of monitor 30. The printer 40 may comprise a color electrophotographic printer, an ink jet printer, or other types of printer 40. Other peripheral devices, such as disk drives and/or tape drives, may also be included but are not essential to understand the present invention and are therefore omitted herein for simplicity.

A user controls the computer 10 by entering commands and data via a keyboard, mouse, pointing device, or other input device 24. Information is output to the user via the monitor 30 allowing interactive control of the computer 10 by the user. The user can cause the computer 10 to create, display, and print business graphics. Processor 12 provides color values for a color image to monitor driver 18, which in turn derives RGB values for each pixel in monitor 30. The RGB values are provided to monitor 30 which displays the image. Processor may also provide color values to printer driver 20 for printing via color printer 40. Printer driver derives CMY values for each pixel of the color image based on the color values received from processor 12. The CMY values may be determined, for example, by reference to a printer table 22 that provides CMY values for color values passed to it by processor 12. The printer table 22 maps color values received from processor 12 to corresponding CMY values for colors that can be reproduced by the color printer 40.

Gamut differences between the color monitor 30 and printer 40 can result in problems when printing business graphics or other images with highly chromatic colors. Business graphics are usually designed with the assistance of a computer 10 with a CRT or LCD monitor 30 as shown in FIG. 1. As noted earlier, the gamut of a CRT or LCD monitor 30 that uses additive color reproduction is typically larger than the gamut of a color printer 40 that uses subtractive color reproduction.

Figure 2:
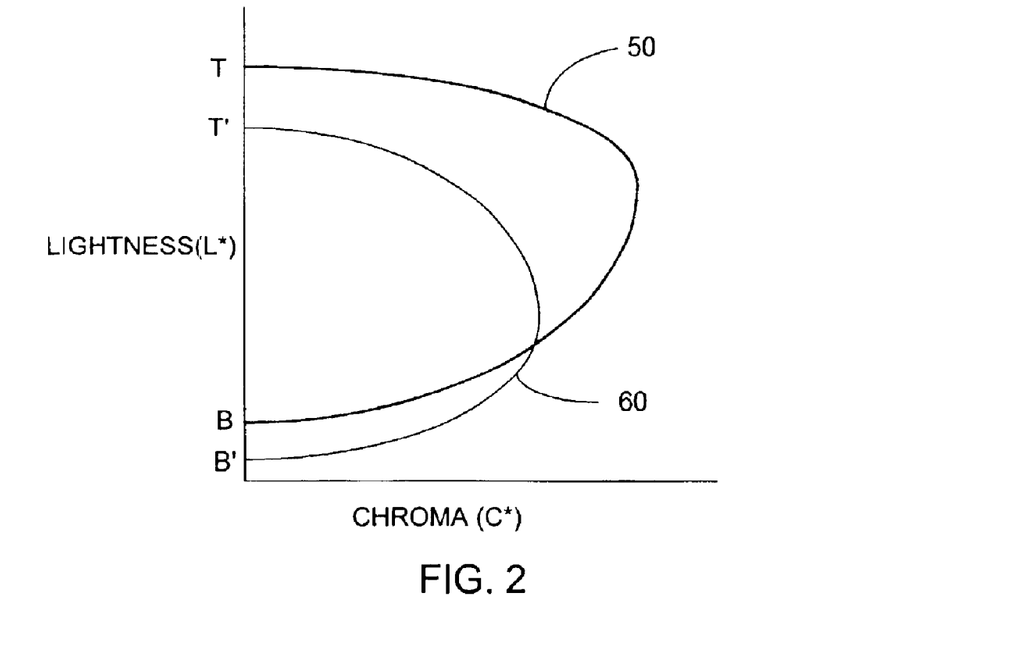
FIG. 2 is a diagram illustrating the gamuts of two devices showing the difference in the color reproduction range of the two devices.

FIG. 2 below illustrates a hypothetical gamut of an input device (such as color monitor 30) and output device (such as color printer 40) at a given hue angle in a device independent color space, such as the Munsell color space or CIELAB color space. The vertical axis represents lightness and the horizontal axis represents chroma. The bold line represents the gamut 50 of the input device, and the thin line represents the gamut 60 of the output device. The gamuts 50, 60 of the input device and output device are represented on the lightness versus chroma plane. As shown in FIG. 2, the gamut 50 of the input device includes colors outside the reproduction range of the output device. Therefore, colors within the reproduction range of the output device must be substituted for these "out-of-gamut" colors. The process of mapping colors reproducible by a first device to colors reproducible by a second device is known as gamut mapping.

The present invention provides a method and apparatus for gamut mapping that may be used, for example, to generate a printer table 22. The gamut mapping algorithm maps colors within the gamut 50 of a first device, referred to herein as the input device, to colors within the gamut 60 of a second device, referred to herein as the output device. Gamut mapping may be performed "on-the-fly" if sufficient processing power is available. However, gamut mapping algorithms may also be used to generate printer tables 22 that speed up the printing process. The printer table 22 contains predetermined mappings of colors from a first device gamut 50 to a second device gamut 60. The printer driver 20 uses the printer table 22 as a look-up table to determine the appropriate color values to send to the printer 40. The printer table 22 includes mappings of "out-of-gamut" colors to "in-gamut" colors thereby avoiding the necessity of performing complex calculations every time an image is printed.

Figure 3:
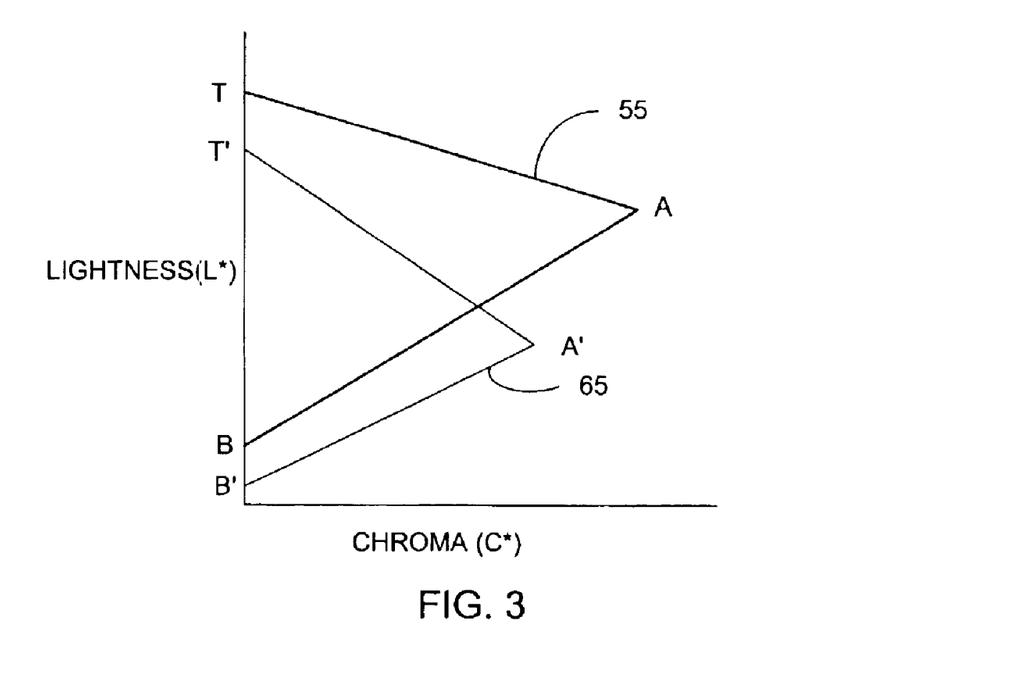
FIG. 3 is a diagram illustrating the maximum triangles for the two gamuts shown in FIG. 2.

According to the present invention, the gamut mapping algorithm transforms colors such that the original hue is preserved while lightness (L*) and chroma (C*) may be varied. A triangle, referred to herein as the maximum triangle, is defined for both the input and output gamuts 50, 60. For each gamut, the top and bottom points on the lightness axis define the base of the maximum triangle and the point of maximum chroma defines the apex of the maximum triangle. FIG. 3 illustrates the maximum triangles 55, 65 for the gamuts shown in FIG. 2 using the point of maximum chroma as the apex of the maximum triangle.

Figure 4:
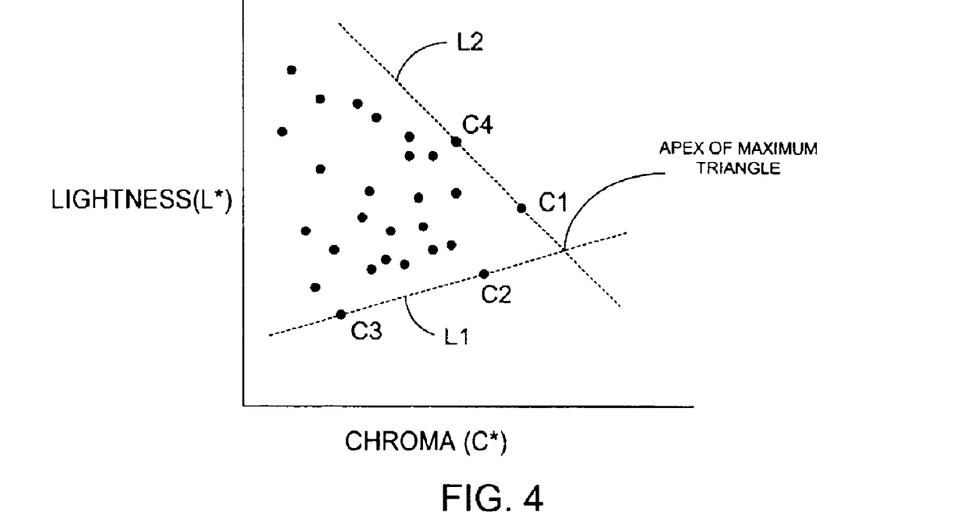
FIG. 4 is a diagram illustrating an alternate method for determining the apex of the maximum triangles shown in FIG. 3.

FIG. 4 illustrates an alternate method for finding the maximum triangle. Each point in FIG. 4 represents a color measured on a hue plane. The peripheral points represent gamut limit colors. The two color points farthest from the lightness axis (i.e. having the maximum chroma) are identified. Those two points are denoted as C1 and C2 in FIG. 4. If point C2 is below point C1 as shown, then point C3 is identified such that all color points will lie above the line L1 drawn through C2 and C3. Point C4 is then selected such that all color points will lie below a line L2 drawn through C1 and C4. The apex of the maximum triangle is the intersection of lines L1 and L2. If point C2 is above point C1, then C3 is selected such that all color points will lie below a line drawn through C2 and C3. In this case point C4 is selected such that all color points will lie above the line drawn through C1 and C4.

The gamut mapping algorithm uses the maximum triangles 55, 65 to transform input colors (e.g. colors within the input gamut) to colors that can be reproduced by the output device (e.g., colors within the output gamut) so as to enhance the chroma or vividness of the reproduced image. The gamut mapping algorithm is particularly useful for business graphics where highly chromatic colors are preferred and color accuracy is not a primary concern.

Gamut mapping is performed in essentially two steps. The first step is to uniformly map the colors within the input gamut 50 to corresponding colors within the output gamut 60. The second step involves applying a color enhancement function to enhance the chroma of the reproduced image. This step is referred to as the color enhancement step.

The goal is to map the gamut triangle 55 represented by TAB to the gamut triangle 65 represented by T'A'B' uniformly, which are shown in FIG. 3. Although numerous methods could be used to map the triangles 55, 65 uniformly, one exemplary method involves three steps. In the first step, the lightness of any given color in the input gamut 50 is rescaled according to the following equation:

$$L' = [L - L(B)] \frac{L(T') - L(B')}{L(T) - L(B)} + L(B') \qquad \text{Eq. (1)}$$

In Eq. 1, L is the input lightness; L' is the output lightness: and L( ) represents the lightness of the point given in the parentheses. Eq. 1 uses the ratio of the lightness range of the output gamut 60, L(T')−L(B'), to the lightness range of the input gamut 50, L(T)−L(B) to scale the lightness of the input gamut colors. The lightness of input colors could also be scaled using other scaling algorithms.

In the second step, chroma of any given color in the input gamut 50 is rescaled according to the following equation:

$$C' = C \frac{C(A')}{C(A)} \qquad \text{Eq. (2)}$$

In Eq. 2, C' is the output chroma; C is the input chroma; and C( ) represents the chroma of the point in the parentheses. Eq. 2 scales the chroma of the input gamut triangle 55 based on the ratio of the maximum chroma of the output gamut triangle 65 to the maximum chroma of the input gamut triangle 55. Other scaling algorithms could also be used to scale the chroma of the input colors.

Figure 5:
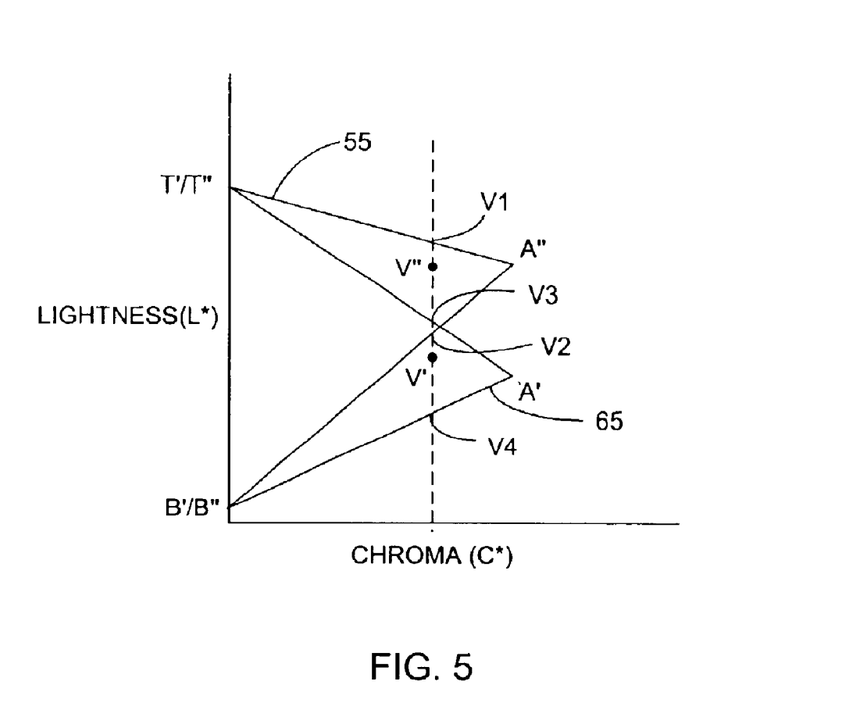
FIG. 5 is a diagram illustrating the maximum triangles after rescaling the lightness and chroma of the input gamut.

Scaling the lightness and chroma of the input colors produces the scaled input gamut triangle T"A"B" shown in FIG. 5. In the third step, the lightness of a color V" in T"A"B" is mapped to a corresponding color V' in T'A'B' along a line of constant chroma so that its relative position to the equal-chroma colors on upper and lower sides of the triangle is maintained. Suppose the vertical line through (V") intercepts T"A" at (V1), B"A" at (V2), T'A' at (V3) and B'A' at (V4). In this case V" is mapped to V' by adjusting the lightness according to the following relationship:

$$L(V') = [L(V'') - L(V2)] \frac{L(V3) - L(V4)}{L(V1) - L(V2)} + L(V4) \qquad \text{Eq. (3)}$$

In Eq. 3 the term L( ) represents the lightness of the point in the parentheses.

Once the gamut mapping algorithm performs this final mapping step, all points on the original input gamut triangle 55 are mapped uniformly to the output gamut triangle 65. Points not in the input gamut triangle 55 will be mapped in the same way and end up at a relative rescaled position outside the output gamut triangle 65.

Figure 6:
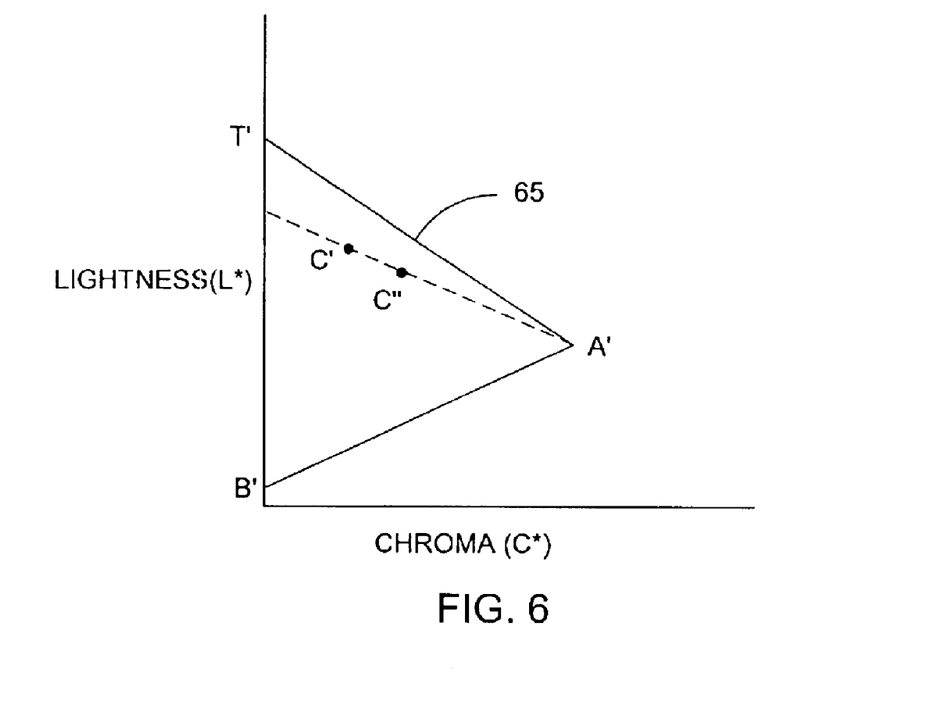
FIG. 6 is a diagram illustrating the color enhancement step to increase the chroma of the output image.

The color enhancement step of the gamut mapping algorithm modifies the colors to enhance the chroma of the reproduced image. FIG. 6 illustrates the color enhancement function. As shown in FIG. 6, the color enhancement function moves the output colors closer to the apex of the output gamut triangle 65 along a line drawn through the apex of the output gamut triangle 65.

Moving the color towards the apex of the output gamut triangle 65 increases the chroma of the color resulting in a more vivid print. Equation 4 below represents an exemplary embodiment of the color enhancement function.

$$\overline{C''A'} = 1 - \overline{C'A'} e^{\left[\frac{\overline{C''A'} - \overline{B'A'}}{\overline{B'A'}}\right]^{\alpha}} \qquad \text{Eq. (4)}$$

In Eq. (4), the variable α is the color enhancement factor that may be varied to adjust the amount of enhancement. The color enhancement factor is typically an integer less than 10.

Following application of the color enhancement function, the gamut mapping algorithm makes a final adjustment to match the enhanced colors to the output gamut 60. Colors outside of the input gamut triangle 55 may not be mapped correctly to points outside the output gamut triangle 65 as shown in FIG. 7.

Figure 7:
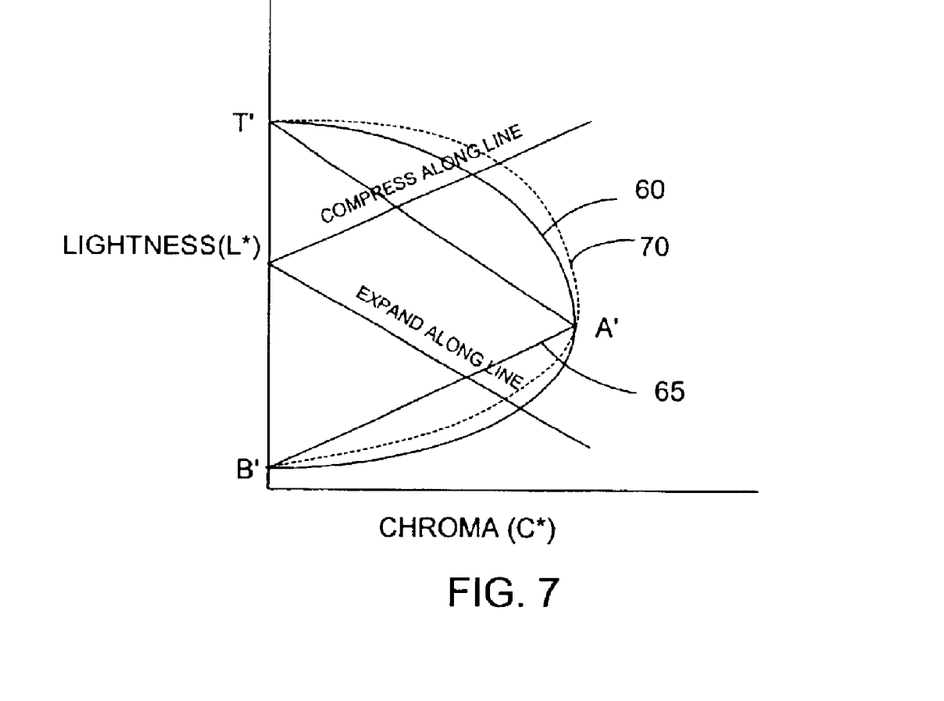
FIG. 7 is a diagram illustrating the final adjustment step to fit the remapped colors to the output gamut.

The solid line in FIG. 7 represents the output gamut 60 of the output device and the dotted line represents the enhanced color gamut 70 produced by the previously described mapping procedures. The final step rescales the enhanced output colors of the enhanced color gamut 70 to fit the output gamut 60 of the output device. The gamut mapping algorithm performs this resealing operation along a line passing through a point on the neutral axis and the enhanced output color. If the intersection of this line with the enhanced color gamut 70 is outside of output gamut 60, then all colors along the line are compressed to fit the output gamut 60. Similarly, if the intersection of this line with the enhanced color gamut 70 is inside the output gamut 60, all colors along the line are expanded to fit the output gamut 60. This last step ensures that the most chromatic colors that the output device can produce are used.

A general purpose programmable computer as shown in FIG. 1 operating according to a program stored in a memory device, such as a hard disk, CD-ROM disk, or other removable media, may be used to perform gamut mapping as described above. Also, the printer 40 could itself include a processor and memory for performing gamut mapping.

The present invention may, of course, be carried out in other specific ways than those herein set forth without departing from the scope and essential characteristics of the invention. For example, the algorithm can be applied in a three-dimensional manner. The present embodiments are, therefore, to be considered in all respects as illustrative and not restrictive, and all changes coming within the meaning and equivalency range of the appended claims are intended to be embraced therein.

What is claimed is:

1. A method of mapping colors reproducible by a first device to colors reproducible by a second device, said method comprising:
    determining an input gamut triangle associated with said first device and an output gamut triangle associated with said second device;
    scaling the lightness and chroma of input colors based on said input gamut and output gamut triangles;
    mapping input colors within the input gamut to output colors along lines of constant chroma; and
    generating enhanced colors by moving the output colors toward the apex of the output gamut triangle along corresponding lines passing through the output colors and the apex of the output gamut triangle.

2. The method of claim 1 wherein determining an input gamut triangle comprises:
    selecting the point of maximum chroma in the input gamut to be the apex of the input gamut triangle; and
    selecting a line extending between the points of maximum and minimum lightness on a lightness axis as the base of the input gamut triangle.

3. The method of claim 1 wherein determining an input gamut triangle comprises:
    selecting first and second color points with the greatest chroma in the input gamut;
    defining first and second intersecting lines passing respectively through said first and second color points such that all points in the input gamut triangle lie between said first and second intersecting lines;
    selecting the intersection of said first and second intersecting lines as the apex of the input gamut triangle; and
    selecting a line extending between the points of maximum and minimum lightness on a lightness axis as the base of the input gamut triangle.

4. The method of claim 1 wherein determining an output gamut triangle comprises:
    selecting the point of maximum chroma in the output gamut to be the apex of the output gamut triangle; and
    selecting a line extending between the points of maximum and minimum lightness on a lightness axis as the base of the output gamut triangle.

5. The method of claim 1 wherein determining an output gamut triangle comprises:
    selecting first and second color points with the greatest chroma in the output gamut;
    defining first and second intersecting lines passing respectively through said first and second color points such that all points in the output gamut triangle lie between said first and second intersecting lines;
    selecting the intersection of said first and second intersecting lines as the apex of the output gamut triangle; and
    selecting a line extending between the points of maximum and minimum lightness on a lightness axis as the base of the output gamut triangle.

6. The method of claim 1 wherein mapping input colors within the input gamut to output colors within the output gamut along lines of constant chroma comprises mapping input colors to output colors such that the relative position of the output colors to the upper and lower bounds of the output gamut triangle are the same as the relative position of the original input colors to the upper and lower bounds of the input gamut triangle.

7. The method of claim 1 further comprising adjusting the gamut of the enhanced colors to match the output gamut triangle.

8. The method of claim 7 wherein adjusting the gamut of the enhanced colors to the output gamut comprises compressing and expanding the enhanced colors along lines extending from a focal point on the neutral axis.

9. The method of claim 8 wherein the selected focal point comprises the center of the base of the output gamut triangle.

10. A device for mapping colors reproducible by a first device to colors reproducible by a second device, said method comprising a processor programmed to:
    determine an input gamut triangle associated with said first device and an output gamut triangle associated with said second device;
    scale the lightness and chroma of input colors based on the input gamut and output gamut triangles;
    map input colors within the input gamut to output colors along lines of constant chroma; and
    generating enhanced colors by moving the output colors toward the apex of the output gamut triangle along corresponding lines passing through the output colors and the apex of the output gamut triangle.

11. The device of claim 10 wherein the processor determines an input gamut triangle by:
    selecting the point of maximum chroma in the input gamut to be the apex of the input gamut triangle; and
    selecting a line extending between the points of maximum and minimum lightness on a lightness axis as the base of the input gamut triangle.

12. The device of claim 10 wherein the processor determines an input gamut triangle by:
    selecting first and second color points with the greatest chroma in the input gamut;
    defining first and second intersecting lines passing respectively through said first and second color points such that all points in the input gamut triangle lie between said first and second intersecting lines;
    selecting the intersection of said first and second intersecting lines as the apex of the input gamut triangle; and
    selecting a line extending between the points of maximum and minimum lightness on a lightness axis as the base of the input gamut triangle.

13. The device of claim 10 wherein the processor determines an output gamut triangle by:
    selecting the point of maximum chroma in the output gamut to be the apex of the output gamut triangle; and
    selecting a line extending between the points of maximum and minimum lightness on a lightness axis as the base of the output gamut triangle.

14. The device of claim 10 wherein the processor determines an output gamut triangle by:
    selecting first and second color points with the greatest chroma in the output gamut;
    defining first and second intersecting lines passing respectively through said first and second color points such that all points in the output gamut triangle lie between said first and second intersecting lines;
    selecting the intersection of said first and second intersecting lines as the apex of the output gamut triangle; and
    selecting a line extending between the points of maximum and minimum lightness on a lightness axis as the base of the output gamut triangle.

15. The device of claim 10 wherein the processor maps input colors within the input gamut to output colors within the output gamut along lines of constant chroma by mapping input colors to output colors such that the relative position of the output colors to the upper and lower bounds of the output gamut triangle are the same as the relative position of the original input colors to the upper and lower bounds of the input gamut triangle.

16. The device of claim 10 wherein the processor adjusts the gamut of the enhanced colors to the output gamut.

17. The device of claim 16 wherein the processor adjusts the gamut of the enhanced colors to the output gamut by compressing and expanding colors in the enhanced color gamut along lines extending between the enhanced colors and a selected focal point on said lightness axis.

18. The device of claim 17 wherein the selected focal point comprises the center of the base of the output gamut triangle.

19. A program stored in a computer-readable medium for mapping colors reproducible by a first device to colors reproducible by a second device, said program including instructions to:

determine an input gamut triangle associated with said first device and an output gamut triangle associated with said second device;

scale the lightness and chroma of input colors based on the input gamut and output gamut triangles;

map input colors within the input gamut to output colors along lines of constant chroma; and generating enhanced colors by moving the output colors toward the apex of the output gamut triangle along corresponding lines passing through the output colors and the apex of the output gamut triangle.

20. The program of claim 19 wherein the processor determines an input gamut triangle by:

selecting the point of maximum chrome in the input gamut to be the apex of the input gamut triangle; and selecting a line extending between the points of maximum and minimum lightness on a lightness axis as the base of the input gamut triangle.

21. The program of claim 19 wherein the processor determines an input gamut triangle by:

selecting first and second color points with the greatest chrome in the input gamut;

defining first and second intersecting lines passing respectively through said first and second color points such that all points in the input gamut triangle lie between said first and second intersecting lines;

selecting the intersection of said first and second intersecting lines as the apex of the input gamut triangle; and selecting a line extending between the points of maximum and minimum lightness on a lightness axis as the base of the input gamut triangle.

22. The program of claim 19 wherein the processor determines an output gamut triangle by:

selecting the point of maximum chroma in the output gamut to be the apex of the output gamut triangle; and selecting a line extending between the points of maximum and minimum lightness on a lightness axis as the base of the output gamut triangle.

23. The program of claim 19 wherein the processor determines an output gamut triangle by:

selecting first and second color points with the greatest chroma in the output gamut;

defining first and second intersecting lines passing respectively through said first and second color points such that all points in the output gamut triangle lie between said first and second intersecting lines;

selecting the intersection of said first and second intersecting lines as the apex of the output gamut triangle; and selecting a line extending between the points of maximum and minimum lightness on a lightness axis as the base of the output gamut triangle.

24. The program of claim 19 wherein the processor maps input colors within the input gamut to output colors within the output gamut along lines of constant chroma by mapping input colors to output colors such that the relative position of the output colors to the upper and lower bounds of the output gamut triangle are the same as the relative position of the original input colors to the upper and lower bounds of the input gamut triangle.

25. The program of claim 19 wherein the processor adjusts the gamut of the enhanced colors to the output gamut.

26. The program of claim 25 wherein the processor adjusts the gamut of the enhanced colors to the output gamut by compressing and expanding colors in the enhanced color gamut along lines extending between the enhanced colors and a selected focal point on said lightness axis.

27. The program of claim 26 wherein the selected focal point comprises the center of the base of the output gamut triangle.

28. A method of mapping colors reproducible by a first device to colors reproducible by a second device, said method comprising:

determining an input gamut triangle associated with said first device and an output gamut triangle associated with said second device;

scaling the lightness and chroma of input colors based on said input gamut and output gamut triangles; and mapping input colors within the input gamut to output colors within the output gamut along lines of constant chroma.

29. The method of claim 28 wherein determining an input gamut triangle comprises:

selecting the point of maximum chroma in the input gamut to be the apex of the input gamut triangle; and selecting a line extending between the points of maximum and minimum lightness on a lightness axis as the base of the input gamut triangle.

30. The method of claim 28 wherein determining an input gamut triangle comprises:

selecting first and second color points with the greatest chroma in the input gamut;

defining first and second intersecting lines passing respectively through said first and second color points such that all points in the input gamut triangle lie between said first and second intersecting lines;

selecting the intersection of said first and second intersecting lines as the apex of the input gamut triangle; and selecting a line extending between the points of maximum and minimum lightness on a lightness axis as the base of the input gamut triangle.

31. The method of claim 28 wherein determining an output gamut triangle comprises:

selecting the point of maximum chroma in the output gamut to be the apex of the output gamut triangle; and selecting a line extending between the points of maximum and minimum lightness on a lightness axis as the base of the output gamut triangle.

32. The method of claim 28 wherein determining an output gamut triangle comprises:
  selecting first and second color points with the greatest chroma in the output gamut;
  defining first and second intersecting lines passing respectively through said first and second color points such that all points in the output gamut triangle lie between said first and second intersecting lines;
  selecting the intersection of said first and second intersecting lines as the apex of the output gamut triangle; and
  selecting a line extending between the points of maximum and minimum lightness on a lightness axis as the base of the output gamut triangle.

33. The method of claim 28 wherein mapping input colors within the input gamut to output colors within the output gamut along lines of constant chroma comprises mapping input colors to output colors such that the relative position of the output colors to the upper and lower bounds of the output gamut triangle are the same as the relative position of the original input colors to the upper and lower bounds of the input gamut triangle.

34. A program stored in a computer-readable medium for mapping colors reproducible by a first device to colors reproducible by a second device, said program including instructions to:
  determine an input gamut triangle associated with said first device and an output gamut triangle associated with said second device;
  scale the lightness and chroma of input colors based on the input gamut and output gamut triangles; and
  map input colors within the input gamut to output colors within the output gamut along lines of constant chroma.

35. The program of claim 34 wherein the processor determines an input gamut triangle by:
  selecting the point of maximum chroma in the input gamut to be the apex of the input gamut triangle; and
  selecting a line extending between the points of maximum and minimum lightness on a lightness axis as the base of the input gamut triangle.

36. The program of claim 34 wherein the processor determines an input gamut triangle by:
  selecting first and second color points with the greatest chroma in the input gamut;
  defining first and second intersecting lines passing respectively through said first and second color points such that all points in the input gamut triangle lie between said first and second intersecting lines;
  selecting the intersection of said first and second intersecting lines as the apex of the input gamut triangle; and
  selecting a line extending between the points of maximum and minimum lightness on a lightness axis as the base of the input gamut triangle.

37. The program of claim 34 wherein the processor determines an output gamut triangle by:
  selecting the point of maximum chroma in the output gamut to be the apex of the output gamut triangle; and
  selecting a line extending between the points of maximum and minimum lightness on a lightness axis as the base of the output gamut triangle.

38. The program of claim 34 wherein the processor determines an output gamut triangle by:
  selecting first and second color points with the greatest chroma in the output gamut;
  defining first and second intersecting lines passing respectively through said first and second color points such that all points in the output gamut triangle lie between said first and second intersecting lines;
  selecting the intersection of said first and second intersecting lines as the apex of the output gamut triangle; and
  selecting a line extending between the points of maximum and minimum lightness on a lightness axis as the base of the output gamut triangle.

39. The program of claim 34 wherein the processor maps input colors within the input gamut to output colors within the output gamut along lines of constant chroma by mapping input colors to output colors such that the relative position of the output colors to the upper and lower bounds of the output gamut triangle are the same as the relative position of the original input colors to the upper and lower bounds of the input gamut triangle.

40. A device for mapping colors reproducible by a first device to colors reproducible by a second device, said method comprising a processor programmed to:
  determine an input gamut triangle associated with said first device and an output gamut triangle associated with said second device;
  scale the lightness and chroma of input colors based on the input gamut and output gamut triangles; and
  map input colors within the input gamut to output colors along lines of constant chroma.

41. The device of claim 40 wherein the processor determines an input gamut triangle by:
  selecting the point of maximum chroma in the input gamut to be the apex of the input gamut triangle; and
  selecting a line extending between the points of maximum and minimum lightness on a lightness axis as the base of the input gamut triangle.

42. The device of claim 40 wherein the processor determines an input gamut triangle by:
  selecting first and second color points with the greatest chroma in the input gamut;
  defining first and second intersecting lines passing respectively through said first and second color points such that all points in the input gamut triangle lie between said first and second intersecting lines;
  selecting the intersection of said first and second intersecting lines as the apex of the input gamut triangle; and
  selecting a line extending between the points of maximum and minimum lightness on a lightness axis as the base of the input gamut triangle.

43. The device of claim 40 wherein the processor determines an output gamut triangle by:
  selecting the point of maximum chroma in the output gamut to be the apex of the output gamut triangle; and
  selecting a line extending between the points of maximum and minimum lightness on a lightness axis as the base of the output gamut triangle.

44. The device of claim 40 wherein the processor determines an output gamut triangle by:
  selecting first and second color points with the greatest chroma in the output gamut;

defining first and second intersecting lines passing respectively through said first and second color points such that all points in the output gamut triangle lie between said first and second intersecting lines;

selecting the intersection of said first and second intersecting lines as the apex of the output gamut triangle; and selecting a line extending between the points of maximum and minimum lightness on a lightness axis as the base of the output gamut triangle.

45. The device of claim 40 wherein the processor maps input colors within the input gamut to output colors within the output gamut along lines of constant chroma by mapping input colors to output colors such that the relative position of the output colors to the upper and lower bounds of the output gamut triangle are the same as the relative position of the original input colors to the upper and lower bounds of the input gamut triangle.

46. A method of enhancing saturation of output colors in an image produced by an output device, the method comprising:

defining a maximum triangle of an output gamut for the output device, said maximum triangle having an apex;

enhancing output colors in the output image by moving the output colors toward the apex of the output gamut triangle along corresponding lines passing through the output colors and the apex of the output gamut triangle.

47. A device for enhancing saturation of output colors in an image produced by an output device, said device comprising a processor programmed to:

define a maximum triangle of an output gamut for the output device, said maximum triangle having an apex; and enhance output colors in the output image by moving the output colors toward the apex of the output gamut triangle along corresponding lines passing through the output colors and the apex of the output gamut triangle.

48. A program stored in a computer-readable medium for enhancing saturation of output colors in an image produced by an output device, said program including instructions to:

define a maximum triangle of an output gamut for the output device, said maximum triangle having an apex; and enhance output colors in the output image by moving the output colors toward the apex of the output gamut triangle along corresponding lines passing through the output colors and the apex of the output gamut triangle.

* * * * *